US008842662B2

(12) United States Patent  
Nguyen et al.

(10) Patent No.: US 8,842,662 B2  
(45) Date of Patent: Sep. 23, 2014

(54) TECHNIQUES FOR TRUNK OPTIMIZATION FOR IMS VOICE CALLS BETWEEN ORIGINATING UE AND TERMINATING UE HOMED IN A CIRCUIT SWITCHED NETWORK

(75) Inventors: Hoa Tuyet Thi Nguyen, Allen, TX (US); Ranjith Weeresinghe, Allen, TX (US); Jayshree Bharatia, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 333 days.

(21) Appl. No.: 13/343,461

(22) Filed: Jan. 4, 2012

(65) Prior Publication Data

US 2012/0177034 A1 Jul. 12, 2012

Related U.S. Application Data

(60) Provisional application No. 61/430,765, filed on Jan. 7, 2011.

(51) Int. Cl.
*H04L 12/66* (2006.01)
*H04L 12/16* (2006.01)
*H04L 29/06* (2006.01)

(52) U.S. Cl.
CPC .......... *H04L 65/1016* (2013.01); *H04L 65/104* (2013.01); *H04L 65/1069* (2013.01); *H04L 65/1083* (2013.01); *H04L 65/103* (2013.01)
USPC .......... 370/352; 370/354; 370/260; 370/261; 370/401

(58) Field of Classification Search
None
See application file for complete search history.

(56) References Cited

U.S. PATENT DOCUMENTS

| | | | |
|---|---|---|---|
| 8,102,811 B2 | 1/2012 | Kwak et al. | |
| 8,180,347 B2 * | 5/2012 | You et al. | 455/436 |
| 2007/0014281 A1 * | 1/2007 | Kant | 370/352 |
| 2007/0149166 A1 * | 6/2007 | Turcotte et al. | 455/404.1 |
| 2007/0259651 A1 * | 11/2007 | Bae et al. | 455/412.1 |
| 2008/0026752 A1 * | 1/2008 | Flore et al. | 455/435.2 |
| 2008/0057962 A1 * | 3/2008 | Long et al. | 455/436 |
| 2008/0102832 A1 * | 5/2008 | Sengupta et al. | 455/435.2 |
| 2008/0205381 A1 * | 8/2008 | Zhu et al. | 370/352 |
| 2009/0080382 A1 | 3/2009 | Chen et al. | |
| 2009/0170555 A1 | 7/2009 | Olvera-Hernandez et al. | |
| 2010/0008353 A1 * | 1/2010 | Li | 370/352 |
| 2010/0039987 A1 * | 2/2010 | Hegde et al. | 370/328 |
| 2010/0067456 A1 * | 3/2010 | Xu et al. | 370/329 |
| 2010/0124897 A1 * | 5/2010 | Edge | 455/404.1 |
| 2010/0215018 A1 * | 8/2010 | Ejzak | 370/331 |

FOREIGN PATENT DOCUMENTS

| | | |
|---|---|---|
| JP | 2008532453 A | 8/2008 |
| KR | 20080018756 A | 2/2008 |

* cited by examiner

*Primary Examiner* — Candal Elpenord
(74) *Attorney, Agent, or Firm* — Jefferson IP Law, LLP (57) ABSTRACT

A method and Voice Call Continuity (VCC) application server to perform trunk optimization for an Internet Protocol (IP) Multimedia Subsystem (IMS) voice call between an originating User Equipment (UE) and a terminating UE, which are homed in a CS network, is provided. The method includes receiving a request from the originating UE for an IMS voice call with the terminating UE, determining whether the VCC application server serves both the originating UE and the terminating UE, and, if it is determined that the VCC application server serves both the originating UE and the terminating UE, controlling to establish a bypass bearer for the IMS voice call between the originating UE and the terminating UE that bypasses the CS network.

19 Claims, 8 Drawing Sheets

TECHNIQUES FOR TRUNK OPTIMIZATION FOR IMS VOICE CALLS BETWEEN ORIGINATING UE AND TERMINATING UE HOMED IN A CIRCUIT SWITCHED NETWORK

CROSS-REFERENCE TO RELATED APPLICATION

This application claims the benefit under 35 U.S.C. §119 (e) of a U.S. provisional patent application filed on Jan. 7, 2011 in the U.S. Patent and Trademark Office and assigned Ser. No. 61/430,765, the entire disclosure of which is hereby incorporated by reference.

BACKGROUND OF THE INVENTION

1. Field of the Invention

Aspects of the present invention relate to Internet Protocol (IP) Multimedia Subsystem (IMS) voice calls. More particularly, aspects of the present invention relate to techniques for trunk optimization for IMS voice calls between an originating User Equipment (UE) and a terminating UE that are homed in a Circuit Switched (CS) network.

2. Description of the Related Art

Due to the coexistence of deployed $3^{rd}$ Generation (3G) and $4^{th}$ Generation (4G) wireless communication networks, it is possible to have 3G and 4G User Equipments (UEs) roaming from the 3G wireless communication network to the 4G wireless communication network and vice a versa. An example of the 3G wireless communication network is the Code Division Multiple Access (CDMA) 1x wireless communication network and an example of the 4G wireless communication network is the Long Term Evolution (LTE) wireless communication network.

The 3G wireless communication network and the 4G wireless communication network employ different types of network communications for voice calls. That is, the 3G wireless communication network employs Circuit Switched (CS) network communications for voice calls, and the 4G wireless communication network employs Packet Switched (PS) network communications for voice calls. However, regardless of whether the 3G and 4G UEs are roaming from one of the 3G and 4G wireless communication networks to the other of the 3G and 4G wireless communication networks, there is a need for voice calls to continue. This is a transitional requirement that remains until all UEs support 4G technologies. Accordingly, there is a need to implement techniques that address this transitional requirement.

The above information is presented as background information only to assist with an understanding of the present disclosure. No determination has been made, and no assertion is made, as to whether any of the above might be applicable as Prior Art with regard to the present invention.

SUMMARY OF THE INVENTION

An aspect of the present invention is to address at least the above-mentioned problems and/or disadvantages and to provide at least the advantages described below. Accordingly, an aspect of the present invention is to provide techniques for trunk optimization for Internet Protocol (IP) Multimedia Subsystem (IMS) voice calls between an originating User Equipment (UE) and a terminating UE that are homed in a Circuit Switched (CS) network.

In accordance with an aspect of the present invention, a method for a Voice Call Continuity (VCC) application server to perform trunk optimization for an IMS voice call between an originating UE and a terminating UE, which are homed in a CS network, is provided. The method includes receiving a request from the originating UE for an IMS voice call with the terminating UE, determining whether the VCC application server serves both the originating UE and the terminating UE, and, if it is determined that the VCC application server serves both the originating UE and the terminating UE, controlling to establish a bypass bearer for the IMS voice call between the originating UE and the terminating UE that bypasses the CS network.

In accordance with another aspect of the present invention, at least one non-transitory processor readable medium for storing a computer program of instructions configured to be readable by at least one processor for instructing the at least one processor to execute a computer process for performing the method recited above, is provided.

In accordance with yet another aspect of the present invention, a VCC application server apparatus for performing trunk optimization for an IMS voice call between an originating UE and a terminating UE, which are homed in a CS network, is provided. The apparatus includes a memory for storing code of a VCC function, a processor for executing the code of the VCC function stored in the memory, a communications unit for sending and receiving information for the VCC function, and the VCC function for receiving a request from the originating UE for an IMS voice call with the terminating UE, for determining whether the VCC function serves both the originating UE and the terminating UE, and, if it is determined that the VCC function serves both the originating UE and the terminating UE, for controlling to establish a bypass bearer for the IMS voice call between the originating UE and the terminating UE that bypasses the CS network.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of term "substantially" is equally applicable when used in a negative connotation to refer to the complete or near complete lack of an action, characteristic, property, state, structure, item, or result.

As used herein, the term "about" is used to provide flexibility to a numerical range endpoint by providing that a given value may be "a little above" or "a little below" the endpoint.

FIGS. 1 through 8, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Exemplary embodiments of the present invention described below relate to Internet Protocol (IP) Multimedia Subsystem (IMS) voice calls. More particularly, exemplary embodiments of the present invention described below relate to techniques for trunk optimization for IMS voice calls where both an originating User Equipment (UE) and a terminating UE support IMS. In addition, exemplary embodiments of the present invention are applicable to the scenario where both the originating UE and the terminating UE are operating in a Packet Switched (PS) network and are homed at a Circuit Switched (CS) network; and originating and terminating legs of an IMS voice call are anchored by a Voice Call Continuity (VCC) function.

While certain aspects the trunk optimization for IMS voice calls between an originating User Equipment (UE) and a terminating UE that are homed in a CS network may be described below in the context of a $3^{rd}$ Generation (3G) wireless communication network, such as a Code Division Multiple Access (CDMA) 1x wireless communication network, as an example of a CS network, those aspects of the present invention are not limited thereto and are similarly applicable to other CS networks, such as Global System for Mobile Communications (GSM), Universal Mobile Telecommunications System (UMTS), CDMA, Wireless Fidelity (WiFi), Worldwide Interoperability for Microwave Access (WiMAX), etc. Similarly, while certain aspects of the trunk optimization for IMS voice calls between an originating User Equipment (UE) and a terminating UE that are homed in a CS network may be described below in the context of a $4^{th}$ Generation (4G) wireless communication network, such as a Long Term Evolution (LTE) wireless communication network, those aspects of the present invention are not limited thereto and are similarly applicable to other PS networks, such as LTE-Advanced (LTE-A), etc.

It should be understood that the following description may refer to terms utilized in various standards merely for simplicity in explanation. For example, the following description may refer to terms utilized in at least one of the 3G Partnership Project (3GPP) standards, such as the CDMA 1x and LTE standards. However, the description herein should not be interpreted as being limited to such standards. Independent of the mechanism used for trunk optimization for IMS voice calls between an originating User Equipment (UE) and a terminating UE that are homed in a CS network, it is advantageous for that ability to conform to a standardized mechanism.

The description of the exemplary embodiments of the present invention may refer to the term "UE." It is to be understood that this is merely a generic term and that the invention is equally applicable to any type of communications device, such as a Personal Computer (PC), a mobile phone, a palm sized PC, a netbook, a Personal Digital Assistant (PDA), a Hand-held PC (HPC), a smart phone, a wireless Local Area Network (LAN) terminal, etc. Accordingly, use of the term "UE" should not limit application of the present inventive concepts to any certain type of apparatus or device.

As described above, there is a need for a technique that addresses the transitional requirement for voice calls where wireless communication networks coexist that employ different types of network communications for the voice calls. For example, the 3G wireless communication network (e.g., the CDMA 1x wireless communication network), which employs CS network communications for voice calls, and the 4G wireless communication network (e.g., LTE wireless communication network), which employs PS network communications for voice calls.

Related Art IMS Voice Call Scenario

A solution according to the related art that addresses the above mentioned transitional requirement is defined by 3GPP standards which make use of a VCC function. The VCC function may be implemented as an application server that is an IMS application server. Alternatively, the VCC function may be implemented as an application server that is not an IMS application server. The application server which supports the VCC function may be limited to the VCC function, or may include one or more additional functions. An optional aspect of the VCC function is to anchor the call legs to the VCC application server, thereby allowing for a seamless transition between CS and PS wireless communication networks. If this optional function is supported in the operator network, the call legs are anchored to the VCC application server regardless of the type of access network used. In this case, the voice call is persisted, as a UE moves between CS and PS wireless communication network domains.

A 4G standard of the related art defines use of IMS for voice calls, which is implemented as an IMS network. Although both originating and terminating UEs support IMS, as a part of a transitional IMS solution, the transitional IMS solution calls for the IMS UE to be homed at the 3G wireless communication network. In a case where both the originating and terminating UEs of a call support IMS, a CS trunking is established from the IMS network to the 3G wireless communication network, then from the 3G wireless communication network to the IMS network for call delivery. Although the call can be handled without any CS trunking, because of the homing at the 3G wireless communication network, the additional CS trunking through the 3G wireless communication network is required. This is a disadvantage of the IMS-IMS call handled by the same VCC function requiring homing at the 3G wireless communication network.

An example of the IMS voice call scenario described above is described below with reference to FIG. 1. Herein it is noted that FIG. 1, as well as FIGS. 2-6, only include information that is assistive in describing the exemplary embodiments of the present invention and do not include a comprehensive list of elements, messages or interactions involved in the corresponding IMS call flow.

Figure 1:
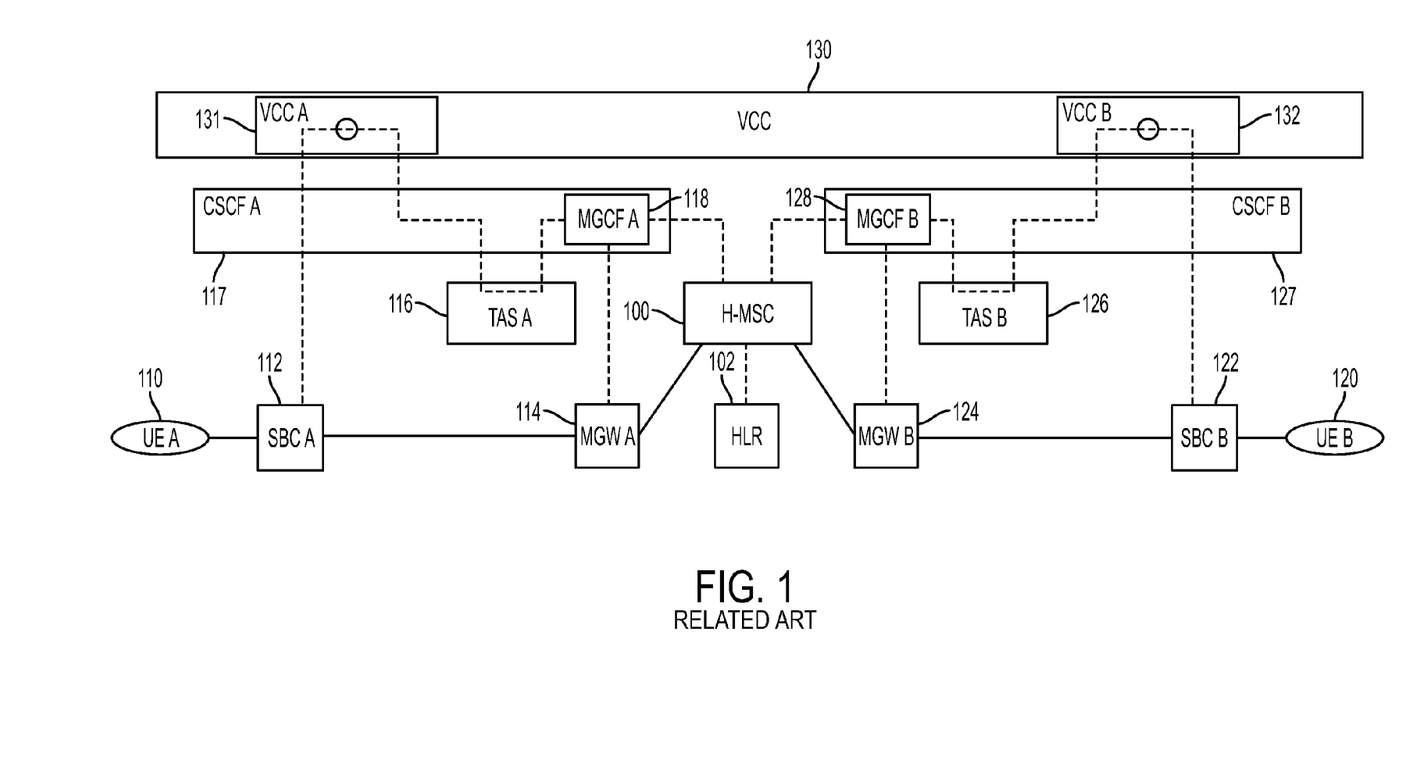
FIG. 1 illustrates an exemplary Internet Protocol (IP) Multimedia Subsystem (IMS) network diagram for a voice call according to the related art.

FIG. 1 illustrates an exemplary IMS network diagram for a voice call according to the related art.

Referring to FIG. 1, the network elements involved in the IMS voice call scenario include an originating UE, UE A 110; a terminating UE, UE B 120; an originating Session Border Controller (SBC), SBC A 112; a terminating SBC, SBC B 122; an originating Media GateWay (MGW), MGW A 114; a terminating MGW, MGW B 124; an originating Telephony Application Server (TAS), TAS A 116; a terminating TAS, TAS B 126; an originating Media Gateway Controller Function (MGCF), MGCF A 118, an originating Call Session Controller Function (CSCF) logically representing proxy, serving and interrogating functions, CSCF A 117, a terminating MGCF, MGCF B 128, a terminating CSCF, logically representing proxy, serving and interrogating functions. CSCF B 127; a Home-Mobile Switching Center (H-MSC) 100; a Home Location Register (HLR) 102; an originating VCC, VCC A 131, and a terminating VCC, VCC B 132. It is noted that the VCC A 131 and the VCC B 132 may be separate VCCs or a common VCC. Also, the VCC A 131 and the VCC B 132 may collectively be referred to as VCC 130. In addition, it is noted that the H-MSC 100 and the HLR 102 are part of the CDMA 1x wireless communication network. Additional and/or different network elements may be included. Similarly, the functionality of two or more network elements may be integrated into a single network element. Herein, while the network elements shown in FIG. 1 are substantially identical to the network elements employed in exemplary embodiments of the present invention, a bearer path and signaling may differ.

The bearer path and signaling for the IMS voice call scenario according to the related art between UE A 110 and UE B 120 will now be described. The bearer path is shown with a solid line and the signaling is shown with a dashed line.

In operation, the UE A 110, while being serviced by the LTE network, initiates a voice call. The originating leg is anchored at the VCC A 131 and the IMS voice call is also maintained at the TAS A 116. The CSCF A 117 routes the IMS voice call to the MGCF A 118 for routing to the H-MSC 100 based on a translation of the calling digits. The H-MSC 100 retrieves an IMS Routing Number (IMRN) to route the IMS voice call to the VCC B 132 for anchoring and for voice call delivery.

As can be seen in FIG. 1, in the exemplary IMS voice call scenario according to the related art, despite the UE A 110 and UE B 120 operating in the LTE network, the bearer path for the IMS voice call includes CS trunks that traverse through the CDMA 1x wireless communication network (e.g., the H-MSC 100).

Given the network environment shown in FIG. 1, exemplary embodiments of the present invention include techniques that minimize trunk resources. That is, instead of using a bearer path that includes CS trunks that traverse through the CDMA 1x wireless communication network, a bearer path that is directly supported between the UE A 110 and the UE B 120 that bypasses the CDMA 1x wireless communication network is established. To minimize trunk resources, the VCC 130 includes a CS trunk optimization function that recognizes call legs belonging to the same IMS voice call and releases CS trunks. Alternatively, the CS trunk optimization function may be implemented in a separate application server.

Herein, exemplary embodiments of the present invention are applicable to the scenario where UE A 110 and the UE B 120 utilize the same or different coder-decoders (CODECs) for the IMS voice call. In addition, exemplary embodiments of the present invention are applicable to the scenario where UE A 110 and the UE B 120 utilize different CODECs for the IMS voice call that either or do not operate in the same Capacity Operating Points (COPs) at the same rate.

Figure 2:
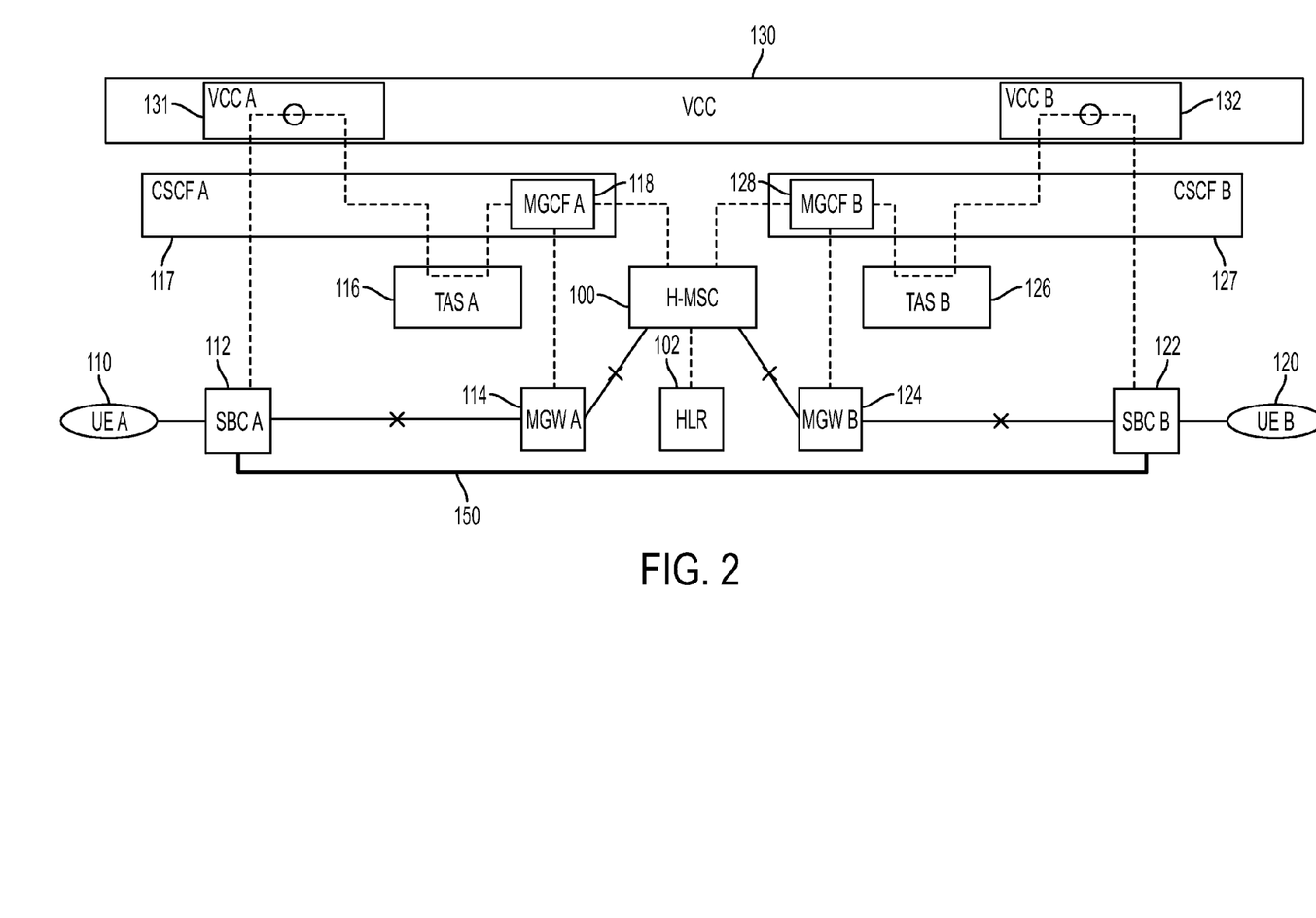
FIG. 2 illustrates an IMS network diagram for a voice call in which the same coder-decoders (CODECs) are employed, or different CODECs are employed that operate in the same Capacity Operating Points (COPs) at the same rate, according to an exemplary embodiment of the present invention.
Figure 3:
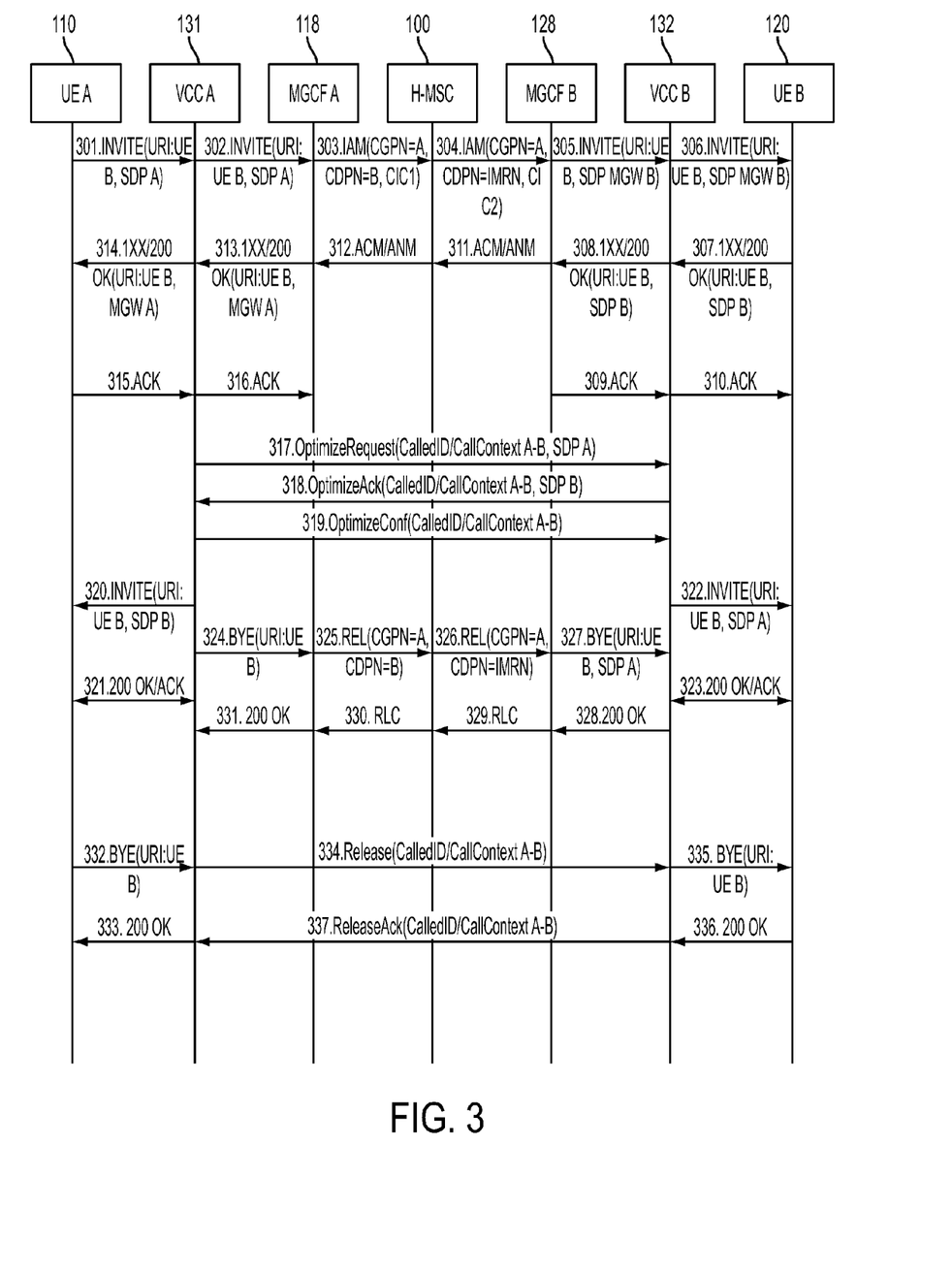
FIG. 3 illustrates a message flow of the IMS voice call scenario shown in FIG. 2 in which the same CODECs are employed.
Figure 4:
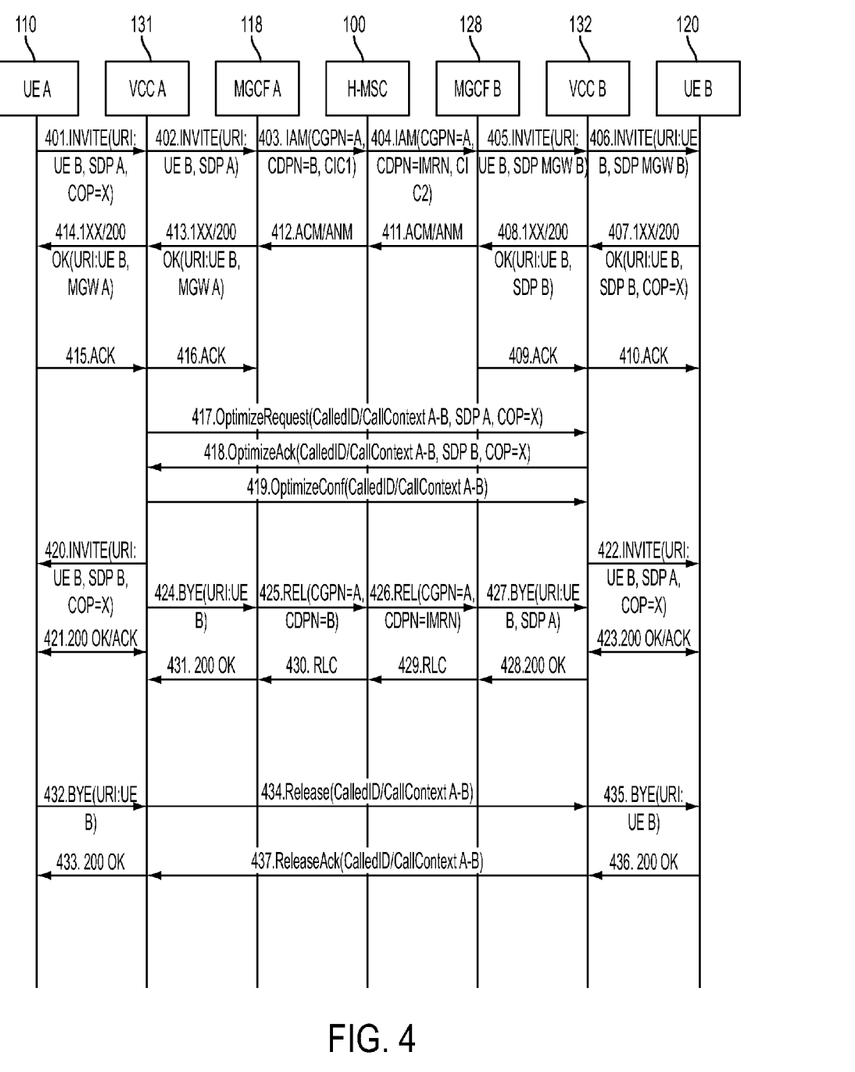
FIG. 4 illustrates a message flow of the IMS voice call scenario shown in FIG. 2 in which different CODECs are employed that operate in the same COPs at the same rate.
Figure 5:
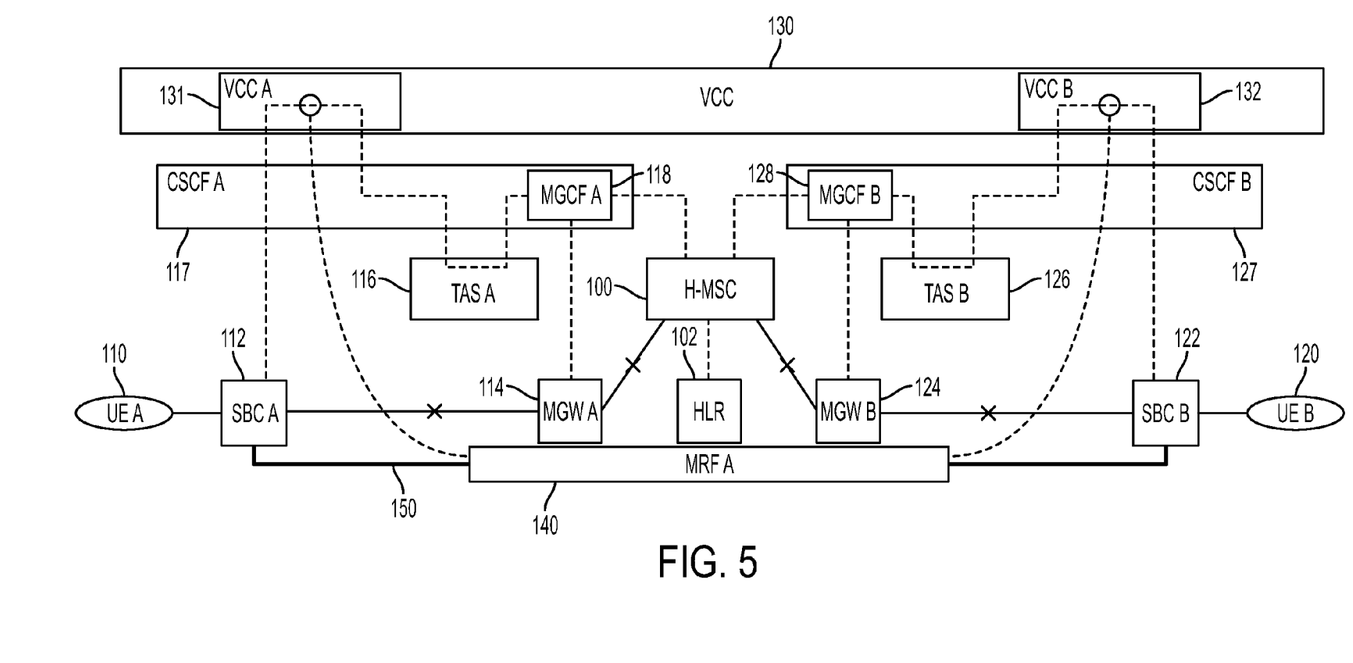
FIG. 5 illustrates an IMS network diagram for a voice call in which different CODECs are employed according to an exemplary embodiment of the present invention.
Figure 6:
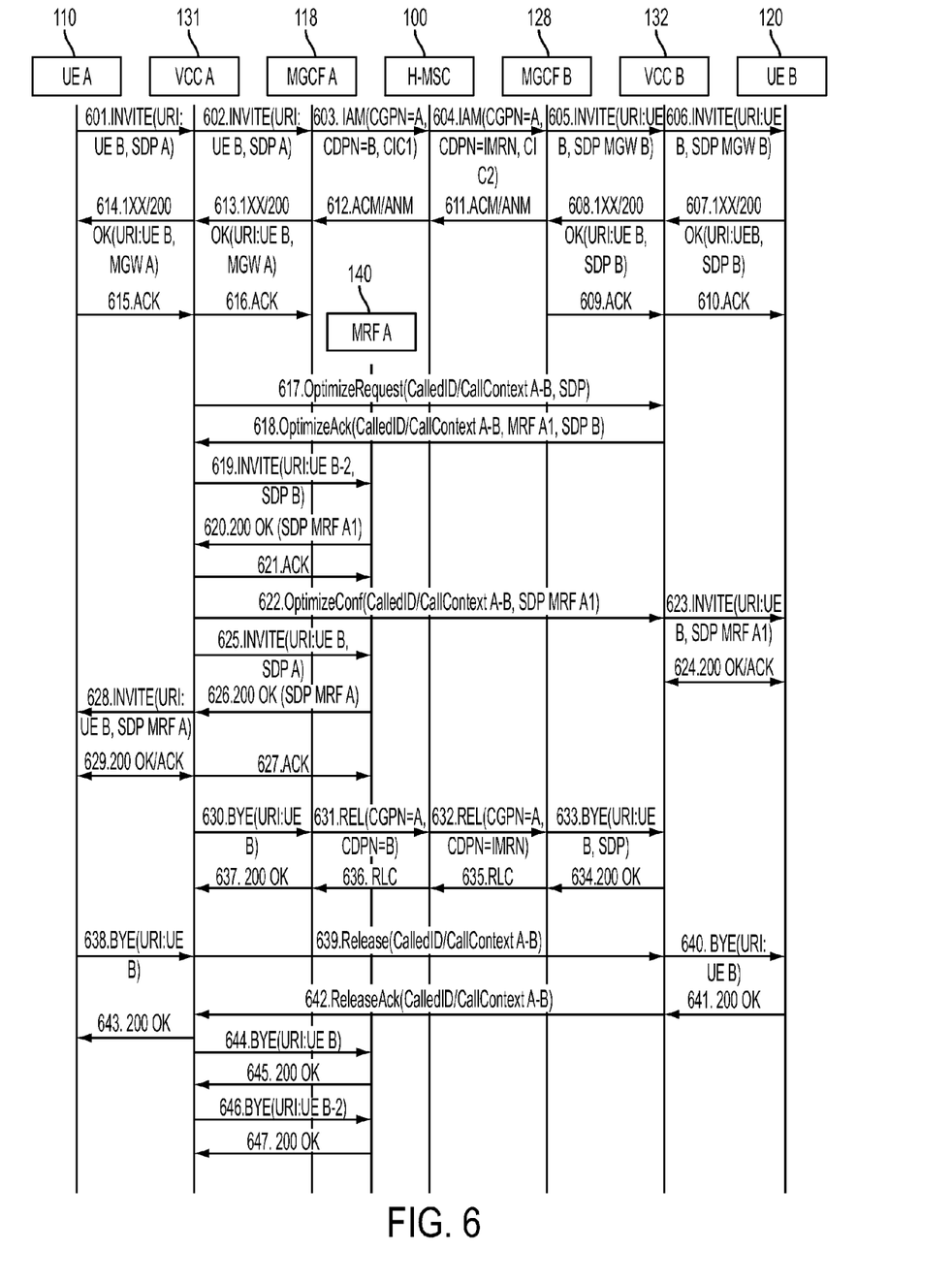
FIG. 6 illustrates a message flow of the IMS voice call scenario shown in FIG. 6 in which different CODECs are employed.

The scenario where the same CODECs are employed is described first with reference to FIGS. 2 and 3, the scenario where the different CODECs are employed that, after consideration of whether the different CODECs operate in the same COPs at the same rate, are found to operate in the same COPs at the same rate, is described thereafter with reference to FIGS. 2 and 4, and the scenario where different CODECs are employed is described thereafter with reference to FIGS. 5 and 6. The scenario described with reference to FIGS. 5 and 6 where different CODECs are employed is applicable to the scenario where different CODECs are employed without consideration of whether the different CODECs operate in the same COPs at the same rate, and the scenario where different CODECs are employed that, after consideration of whether the different CODECs operate in the same COPs at the same rate, are found to not operate in the same COPs at the same rate.

IMS Voice Call Scenario where the Same CODECs are Employed

FIG. 2 illustrates an IMS network diagram for a voice call in which the same CODECs are employed according to an exemplary embodiment of the present invention. FIG. 3 illustrates a message flow of the IMS voice call scenario shown in FIG. 2 in which the same CODECs are employed. The network elements shown in FIGS. 2 and 3 are substantially the same as the network elements shown in FIG. 1, and thus a description thereof is omitted for brevity.

Referring to FIGS. 2 and 3, in step 301, the UE A 110, while being serviced by the LTE network, initiates a voice call by sending an INVITE message to VCC A 131. The INVITE message sent in step 301 includes a Uniform Resource Identifier (URI) of UE B 120 and Session Description Protocol (SDP) information of the UE A 110. The SDP information of the UE A 110 includes codec information of UE A 110. In addition, depending on the exemplary implementation, the INVITE message sent in step 301 may additionally include COPs and/or rate information of UE A 110. The VCC A 131 stores the VCC A context, which includes at least one of a Calling Party Number (CgPN), a Called Party Number (CdPN), a Term Status, and the SDP information of the UE A 110. The VCC A context may additionally include COPs and/or rate information. In step 302, the VCC A 131 routes the INVITE message to the MGCF A 118. The INVITE message routed in step 302 may be substantially the same as the INVITE message sent in step 301.

In step 303, the MGCF A 118 sends an Initial Address Message (IAM) to the H-MSC 100. The IAM sent in step 303 includes a number of the UE A 110 as the CgPN, a number of the UE B 120 as the CdPN, and a first Circuit Identification Code (CIC) CIC1. In step 304, the H-MSC 100 sends an IAM to the MGCF B 128. The IAM sent in step 304 includes the number of the UE A 110 as the CgPN, the number of the UE B 120 as the CdPN, and a second CIC CIC2.

In step 305, the MGCF B 128 sends an INVITE message to the VCC B 132. The INVITE message sent in step 305 includes the URI of UE B 120 and SDP information of the MGW B 124. In step 306, the VCC B 132 routes the INVITE message to the UE B 120. The INVITE message routed in step 306 may be substantially the same as the INVITE message sent in step 305.

In step 307, the UE B 120 sends a 1xx/200 OK message to the VCC B 132. The 1xx/200 OK message sent in step 307 includes a URI of the UE B 120 and SDP information of the UE B 120. In addition, depending on the exemplary implementation, the 1xx/200 OK message sent in step 307 may additionally include COPs and/or rate information of UE B 120. In step 308, the VCC B 132 routes the 1xx/200 OK message to the MGCF B 128. The 1xx/200 OK message routed in step 308 may be substantially the same as the 1xx/200 OK message sent in step 307.

In step 309, the MGCF B 128 sends an ACKnowledgment (ACK) message to the VCC B 132. In step 310, the VCC B 132 routes the ACK message to the UE B 120. The ACK message routed in step 310 may be substantially the same as the ACK message sent in step 309.

Meanwhile, in step 311, the MGCF B 128 sends an Address Complete Message (ACM)/Address Answer Message (ANM) to the H-MSC 100. In step 312, the H-MSC 100 routes the ACM/ANM to the MGCF A 118. The ACM/ANM routed in step 311 may be substantially the same as the ACM/ANM sent in step 312.

In step 313, the MGCF A 118 sends a 1xx/200 OK message to the VCC A 131. The 1xx/200 OK message sent in step 313 includes the URI of UE B 120 and SDP information of the MGW A 114. In step 314, the VCC A 131 routes the 1xx/200 OK message to the UE A 110. The 1xx/200 OK message routed in step 314 may be substantially the same as the 1xx/200 OK message sent in step 313.

In step 315, the UE A 110 sends an ACK message to the VCC A 131. In step 316, the VCC A 131 routes the ACK message to the MGCF A 118. The ACK message routed in step 316 may be substantially the same as the ACK message sent in step 315.

It is noted that at this point, the call context maintained at VCC A 131 for the call between UE A 110 and UE B 120 includes the SDP information of UE A 110 and the SDP information of MGW A 114. The call context maintained at VCC A 131 may additionally include COPs and/or rate information. Similarly, the call context maintained at VCC B 132 for the call between UE A 110 and UE B 120 includes the SDP information of UE B 120 and the SDP information of MGW B 124. The call context maintained at VCC B 132 may additionally include COPs and/or rate information.

Herein, it is noted that steps 301 through 316 are similar to steps for establishing a call according to the related art. That is, once the ACK message is received from the UE A 110 in step 316, the IMS voice call is setup through a bearer path that includes CS trunks that traverse through the CDMA 1x wireless communication network (e.g., the H-MSC 100), as shown in FIG. 1. However, VCC A 131 performs a trunk optimization function for bypassing and releasing the CS trunks that traverse through the CDMA 1x wireless communication network. This operation is described below in steps 317 through 331.

Based on the response from the VCC B 132, namely the contents of the 1xx/200 OK message sent in step 313, the VCC A 131 determines whether the VCC A 131 and the VCC B 132 are the same VCC, namely VCC 130. If the VCC A 131 determines that the VCC A 131 and the VCC B 132 are different VCCs, the VCC A 131 continues to process the IMS voice call according to the related art (e.g., the VCC A 131 waits for a Call Release from either UE A 110 or UE B 120). In contrast, if the VCC A 131 determines that the VCC A 131 and the VCC B 132 are the same VCC, namely VCC 130, the VCC A 131 initiates CS trunking optimization once the ACK message is received from the UE A 110 in step 316, which indicates that the IMS call has been setup. Here, it is assumed that the VCC A 131 determines that the VCC A 131 and the VCC B 132 are the same VCC, namely VCC 130.

Herein, it is also assumed that the UE A 110 and the UE B 120 support the same CODECs. The scenario where the UE A 110 and the UE B 120 support different CODECs that operate in the same COPs at the same rate is described below with reference to FIGS. 2 and 4. Also, the scenario where the UE A 110 and the UE B 120 support different CODECs without consideration of whether the different CODECs operate in the same COPs at the same rate, and the scenario where the UE A 110 and the UE B 120 support different CODECs that, after consideration of whether the different CODECs operate in the same COPs at the same rate, are found to not operate in the same COPs at the same rate, are described below with reference to FIGS. 5 and 6.

At this point the VCC A 131 has determined that the VCC A 131 and the VCC B 132 are the same VCC, namely VCC 130. Thus, CS trucking optimization is triggered, which is described in steps 317 through 319.

In step 317, to initiate CS trucking optimization, the VCC A 131 sends an Optimize Request message to the VCC B 132. The Optimize Request message sent in step 317 includes a Called IDentifier (ID), a Call Context of the call between the UE A 110 and the UE B 120, and SDP information of the UE A 110. At this point, the VCC B 132 determines that UE A 110 and UE B 120 support the same CODECs.

In step 318, the VCC B 132 sends an Optimize ACK message to the VCC A 131. The Optimize ACK message sent in step 318 includes the Called ID, the Call Context of the call between the UE A 110 and the UE B 120, and SDP information of the UE B 120. At this point, the VCC A 131 determines that UE A 110 and UE B 120 support the same CODECs.

In step 319, the VCC A 131 sends an Optimize Confirm message to the VCC B 132. The Optimize Confirm message sent in step 319 includes the Called ID and the Call Context of the call between the UE A 110 and the UE B 120. Here, the triggering of the CS trucking optimization triggers the establishment of a bypass bearer 150 in steps 320 through 323, and the release of the CS trunks (marked with an 'X') in steps 324 through 331.

To establish the bypass bearer 150, in step 320, the VCC A 131 sends an INVITE message to the UE A 110. The INVITE message in step 320 includes a URI of UE B 120 and SDP information of the UE B 120. In step 321, 200 OK and ACK messages are exchanged between the UE A 110 and the VCC A 131. Meanwhile, in step 322, the VCC B 132 sends an INVITE message to the UE B 120. The INVITE message in step 322 includes a URI of UE B 120 and SDP information of the UE A 110. In step 323, 200 OK and ACK messages are exchanged between the UE B 120 and the VCC B 132. At this point, the bypass bearer path 150 shown in FIG. 2 is established that bypasses the CS trunks.

It is noted that at this point, the call context maintained at VCC A 131 for the call between UE A 110 and UE B 120 includes the SDP information of UE A 110 and the SDP information of UE B 120. The call context maintained at VCC A 131 may additionally include COPs and/or rate information. Similarly, the call context maintained at VCC B 132 for the call between UE A 110 and UE B 120 includes the SDP information of UE B 120 and the SDP information of UE A 110. The call context maintained at VCC B 132 may additionally include COPs and/or rate information.

Meanwhile, to release the CS trunks (marked with an 'X'), in step 324, the VCC A 131 sends a BYE message to the MGCF A 118. The BYE message sent in step 324 includes the URI of UE B 120. In step 325, the MGCF A 118 sends a Release (REL) message to the H-MSC 100. The REL message sent in step 325 includes the number of the UE A 110 as the CgPN and the number of the UE B 120 as the CdPN. In step 326, the H-MSC 100 sends a REL message to the MGCF B 128. The REL message sent in step 326 includes the number of the UE A 110 as the CgPN and an IMS Routing Number (IMRN) as the CdPN. In step 327, the MGCF B 128 sends a BYE message to the VCC B 132. The BYE message sent in step 327 includes the URI of the UE B 120 and SDP information for UE A 110. In step 328, the VCC B 132 sends a 200 OK message to the MGCF B 128. In step 329, the MGCF B 128 sends a ReLease Complete (RLC) message to the H-MSC 100. In step 330, the H-MSC 100 routes the RLC message to the MGCF A 118. In step 331, the MGCF A 118 sends a 200 OK message to the VCC A 131.

At this point, the CS trunks (marked with an 'X') including CIC1 and CIC2 for the voice call between UE A 110 and UE B 120 are released at the MGW A 114 and the MGW B 124. Herein, it is noted that the CS trunks are released without the VCC B 132 releasing toward the UE B 120.

Regarding call release for when the call is to be terminated, either the UE A 110 or the UE B 120 may initiate Call Release. For convenience in explanation, it is assumed herein that the UE A 110 initiates Call Release. That is, in step 332, the UE A 110 sends a BYE message to the VCC A 131. The BYE message sent in step 332 includes the URI of UE B 120. In step 334, the VCC A 131 sends a Release message to VCC B 132. The Release message sent in step 334 includes the Called ID and the Call Context of the call between the UE A 110 and the UE B 120. In step 335, the VCC B sends a BYE message to the UE B 120. The BYE message includes the URI of UE B 120. In step 336, the UE B 120 sends a 200 OK message to the VCC B 132. In step 337, the VCC B 132 sends a Release ACK message to the VCC A 131. The Release ACK message sent in step 337 includes the Called ID and the Call Context of the call between the UE A 110 and the UE B 120. In step 333, the VCC A sends a 200 OK message to the UE A 110. At this point, the voice call is terminated and the bypass bearer path 150 shown in FIG. 2 is released.

In the above scenario, it is assumed that the originating and terminating UEs, UE A 110 and UE B 120, utilize the same CODECs. However, in the case where the CODECs used by the originating and terminating UEs, UE A 110 and UE B 120, are different, the VCC A 131 may determine whether the different CODECs used operate in the same COPs at the same rate. In this case, if the different CODECs used by UE A 110 and UE B 120 operate in the same COPs at the same rate, the bypass bearer may still be established. The scenario where different CODECs are employed that operate in the same COPs at the same rate is described below with reference to FIGS. 2 and 4.

IMS Voice Call Scenario where Different CODECs are Employed that Operate in the Same COPs at the Same Rate FIG. 2 also illustrates an IMS network diagram for a voice call in which different CODECs are employed that operate the same COPs at the same rate according to an exemplary embodiment of the present invention. FIG. 4 illustrates a message flow of the IMS voice call scenario shown in FIG. 2 in which different CODECs are employed that operate in the same COPs at the same rate. The network elements shown in FIGS. 2 and 4 are substantially the same as the network elements shown in FIG. 1, and thus a description thereof is omitted for brevity.

Referring to FIGS. 2 and 4, in step 401, the UE A 110, while being serviced by the LTE network, initiates a voice call by sending an INVITE message to VCC A 131. The INVITE message sent in step 401 includes a URI of UE B 120, SDP information of the UE A 110, and COPs and/or rate information of UE A 110. The SDP information of the UE A 110 includes codec information of UE A 110. The VCC A 131 stores the VCC A context, which includes at least one of a Calling Party Number CgPN, a Called Party Number CdPN, a Term Status, and the SDP information of the UE A 110. The VCC A context may additionally include COPs and/or rate information. In step 402, the VCC A 131 routes the INVITE message to the MGCF A 118. The INVITE message routed in step 402 may be substantially the same as the INVITE message sent in step 401.

In step 403, the MGCF A 118 sends an IAM to the H-MSC 100. The IAM sent in step 403 includes a number of the UE A 110 as the CgPN, a number of the UE B 120 as the CdPN, and a first CIC CIC1. In step 404, the H-MSC 100 sends an IAM to the MGCF B 128. The IAM sent in step 404 includes the number of the UE A 110 as the CgPN, the number of the UE B 120 as the CdPN, and a second CIC CIC2.

In step 405, the MGCF B 128 sends an INVITE message to the VCC B 132. The INVITE message sent in step 405 includes the URI of UE B 120 and SDP information of the MGW B 124. In step 406, the VCC B 132 routes the INVITE message to the UE B 120. The INVITE message routed in step 406 may be substantially the same as the INVITE message sent in step 405.

In step 407, the UE B 120 sends a 1xx/200 OK message to the VCC B 132. The 1xx/200 OK message sent in step 407 includes a URI of the UE B 120, SDP information of the UE B 120, and COPs and/or rate information of UE B 120. In step

408, the VCC B 132 routes the 1xx/200 OK message to the MGCF B 128. The 1xx/200 OK message routed in step 408 may be substantially the same as the 1xx/200 OK message sent in step 407.

In step 409, the MGCF B 128 sends an ACK message to the VCC B 132. In step 410, the VCC B 132 routes the ACK message to the UE B 120. The ACK message routed in step 410 may be substantially the same as the ACK message sent in step 409.

Meanwhile, in step 411, the MGCF B 128 sends an ACM/ANM to the H-MSC 100. In step 412, the H-MSC 100 routes the ACM/ANM to the MGCF A 118. The ACM/ANM routed in step 411 may be substantially the same as the ACM/ANM sent in step 412.

In step 413, the MGCF A 118 sends a 1xx/200 OK message to the VCC A 131. The 1xx/200 OK message sent in step 413 includes the URI of UE B 120 and SDP information of the MGW A 114. In step 414, the VCC A 131 routes the 1xx/200 OK message to the UE A 110. The 1xx/200 OK message routed in step 414 may be substantially the same as the 1xx/200 OK message sent in step 413.

In step 415, the UE A 110 sends an ACK message to the VCC A 131. In step 416, the VCC A 131 routes the ACK message to the MGCF A 118. The ACK message routed in step 416 may be substantially the same as the ACK message sent in step 415.

It is noted that at this point, the call context maintained at VCC A 131 for the call between UE A 110 and UE B 120 includes the SDP information of UE A 110, the SDP information of MGW A 114, and the COPs information of UE B 120. Similarly, the call context maintained at VCC B 132 for the call between UE A 110 and UE B 120 includes the SDP information of UE B 120 and the SDP information of MGW B 124. In addition, the call context maintained at VCC B 132 for the call between UE A 110 and UE B 120 may include the COPs information of UE A 110.

Herein, it is noted that steps 401 through 416 are similar to steps for establishing a call according to the related art. That is, once the ACK message is received from the UE A 110 in step 416, the IMS voice call is setup through a bearer path that includes CS trunks that traverse through the CDMA 1x wireless communication network (e.g., the H-MSC 100), as shown in FIG. 1. However, VCC A 131 performs a trunk optimization function for bypassing and releasing the CS trunks that traverse through the CDMA 1x wireless communication network. This operation is described below in steps 417 through 431.

Based on the response from the VCC B 132, namely the contents of the 1xx/200 OK message sent in step 413, the VCC A 131 determines whether the VCC A 131 and the VCC B 132 are the same VCC, namely VCC 130. If the VCC A 131 determines that the VCC A 131 and the VCC B 132 are different VCCs, the VCC A 131 continues to process the IMS voice call according to the related art (e.g., the VCC A 131 waits for a Call Release from either UE A 110 or UE B 120). In contrast, if the VCC A 131 determines that the VCC A 131 and the VCC B 132 are the same VCC, namely VCC 130, the VCC A 131 initiates CS trunking optimization once the ACK message is received from the UE A 110 in step 416, which indicates that the IMS call has been setup. Here, it is assumed that the VCC A 131 determines that the VCC A 131 and the VCC B 132 are the same VCC, namely VCC 130.

Herein, it is also assumed that the UE A 110 and the UE B 120 support different CODECs and that the different CODECs operate in the same COPs at the same rate. The scenario where the UE A 110 and the UE B 120 support the same CODECs was described above with reference to FIGS. 2 and 3. Also, the scenario where the UE A 110 and the UE B 120 support different CODECs without consideration of whether the different CODECs operate in the same COPs at the same rate, and the scenario where the UE A 110 and the UE B 120 support different CODECs that, after consideration of whether the different CODECs operate in the same COPs at the same rate, are found to not operate in the same COPs at the same rate, are described below with reference to FIGS. 5 and 6.

At this point the VCC A 131 has determined that the VCC A 131 and the VCC B 132 are the same VCC, namely VCC 130. Thus, CS trucking optimization is triggered, which is described in steps 417 through 419.

In step 417, to initiate CS trucking optimization, the VCC A 131 sends an Optimize Request message to the VCC B 132. The Optimize Request message sent in step 417 includes a Called ID, a Call Context of the call between the UE A 110 and the UE B 120, SDP information of the UE A 110, and COPs and/or rate information. At this point, the VCC B 132 determines that UE A 110 and UE B 120 support different CODECs that operate in the same COPs at the same rate.

In step 418, the VCC B 132 sends an Optimize ACK message to the VCC A 131. The Optimize ACK message sent in step 418 includes the Called ID, the Call Context of the call between the UE A 110 and the UE B 120, SDP information of the UE B 120, and COPs and/or rate information. At this point, the VCC A 131 determines that UE A 110 and UE B 120 support different CODECs that operate in the same COPs at the same rate.

In step 419, the VCC A 131 sends an Optimize Confirm message to the VCC B 132. The Optimize Confirm message sent in step 419 includes the Called ID and the Call Context of the call between the UE A 110 and the UE B 120. Here, the triggering of the CS trucking optimization triggers the establishment of a bypass bearer 150 in steps 420 through 423, and the release of the CS trunks (marked with an 'X') in steps 424 through 431.

To establish the bypass bearer 150, in step 420, the VCC A 131 sends an INVITE message to the UE A 110. The INVITE message in step 420 includes a URI of UE B 120, SDP information of the UE B 120, and COPs and/or rate information of UE B 120. In step 421, 200 OK and ACK messages are exchanged between the UE A 110 and the VCC A 131. Meanwhile, in step 422, the VCC B 132 sends an INVITE message to the UE B 120. The INVITE message in step 422 includes a URI of UE B 120, SDP information of the UE A 110, and COPs and/or rate information of UE A 110. In step 423, 200 OK and ACK messages are exchanged between the UE B 120 and the VCC B 132. At this point, the bypass bearer path 150 shown in FIG. 2 is established that bypasses the CS trunks.

It is noted that at this point, the call context maintained at VCC A 131 for the call between UE A 110 and UE B 120 includes the SDP information of UE A 110, the SDP information of UE B 120, and COPs and/or rate information of UE B 120. Similarly, the call context maintained at VCC B 132 for the call between UE A 110 and UE B 120 includes the SDP information of UE B 120 and the SDP information of UE A 110. In addition, the call context maintained at VCC B 132 may include COPs and/or rate information of UE A 110.

Meanwhile, to release the CS trunks (marked with an 'X'), in step 424, the VCC A 131 sends a BYE message to the MGCF A 118. The BYE message sent in step 424 includes the URI of UE B 120. In step 425, the MGCF A 118 sends a REL message to the H-MSC 100. The REL message sent in step 425 includes the number of the UE A 110 as the CgPN and the number of the UE B 120 as the CdPN. In step 426, the H-MSC 100 sends a REL message to the MGCF B 128. The REL message sent in step 426 includes the number of the UE A 110 as the CgPN and an IMRN as the CdPN. In step 427, the MGCF B 128 sends a BYE message to the VCC B 132. The BYE message sent in step 427 includes the URI of the UE B 120 and SDP information for UE A 110. In step 428, the VCC B 132 sends a 200 OK message to the MGCF B 128. In step 429, the MGCF B 128 sends a RLC message to the H-MSC 100. In step 430, the H-MSC 100 routes the RLC message to the MGCF A 118. In step 431, the MGCF A 118 sends a 200 OK message to the VCC A 131.

At this point, the CS trunks (marked with an 'X') including CIC1 and CIC2 for the voice call between UE A 110 and UE B 120 are released at the MGW A 114 and the MGW B 124. Herein, it is noted that the CS trunks are released without the VCC B 132 releasing toward the UE B 120.

Regarding call release for when the call is to be terminated, either the UE A 110 or the UE B 120 may initiate Call Release. For convenience in explanation, it is assumed herein that the UE A 110 initiates Call Release. That is, in step 432, the UE A 110 sends a BYE message to the VCC A 131. The BYE message sent in step 432 includes the URI of UE B 120. In step 434, the VCC A 131 sends a Release message to VCC B 132. The Release message sent in step 434 includes the Called ID and the Call Context of the call between the UE A 110 and the UE B 120. In step 435, the VCC B sends a BYE message to the UE B 120. The BYE message includes the URI of UE B 120. In step 436, the UE B 120 sends a 200 OK message to the VCC B 132. In step 437, the VCC B 132 sends a Release ACK message to the VCC A 131. The Release ACK message sent in step 437 includes the Called ID and the Call Context of the call between the UE A 110 and the UE B 120. In step 433, the VCC A sends a 200 OK message to the UE A 110. At this point, the voice call is terminated and the bypass bearer path 150 shown in FIG. 2 is released.

In the above scenario, it is assumed that the originating and terminating UEs, UE A 110 and UE B 120, utilize different CODECs that operate in the same COPs at the same rate. However, in the case where the CODECs used by the originating and terminating UEs, UE A 110 and UE B 120, are different and do not operate in the same COPs at the same rate, a Media Resource Function (MRF) may be employed in the bypass bearer path to perform transcoding of the IMS voice call. Also, the MRF may be employed in the bypass bearer path to perform transcoding of the IMS voice call for the case where the originating and terminating UEs, UE A 110 and UE B 120, employ different CODECs without consideration of whether the different CODECs operate in the same COPs at the same rate. These scenarios are described below with reference to FIGS. 5 and 6.

IMS Voice Call Scenario where Different CODECs are Employed without Consideration of Whether the Different CODECs Operate in Same COPs at Same Rate or where Different Codecs are Employed that do not Operate in the Same COPs at the Same Rate FIG. 5 illustrates an IMS network diagram for a voice call in which different CODECs are employed according to an exemplary embodiment of the present invention. FIG. 6 illustrates a message flow of the IMS voice call scenario shown in FIG. 5 in which different CODECs are employed. The network elements shown in FIGS. 5 and 6, other than the MRF A 140, are substantially the same as the network elements shown in FIG. 1, and thus a description thereof is omitted for brevity. The MRF A 140 is employed in the bypass bearer path to perform transcoding of the IMS voice call when the CODECs employed by the UE A 110 and the UE B 120 are different. The MRF A 140 may be implemented in an application server.

As will be described below, the scenario shown in FIG. 5 is applicable to the scenario where different CODECs are employed without consideration of whether the different CODECs operate in the same COPs at the same rate, and the scenario where different CODECs are employed that, after consideration of whether the different CODECs operate in the same COPs at the same rate, are found to not operate in the same COPs at the same rate.

Referring to FIGS. 5 and 6, in step 601, UE A 110 while being serviced by the LTE network initiates a voice call by sending an INVITE message to VCC A 131. The INVITE message sent in step 601 includes a URI of UE B 120 and SDP information of the UE A 110. The SDP information of the UE A 110 includes codec information of UE A 110. In addition, depending on the exemplary implementation, the INVITE message sent in step 301 may additionally include COPs and/or rate information of UE A 110. The VCC A 131 stores the VCC A context, which includes at least one of a CgPN, a CdPN, a Term Status, and the SDP information of the UE A 110. The VCC A context may include COPs and/or rate information. In step 602, the VCC A 131 routes the INVITE message to the MGCF A 118. The INVITE message routed in step 602 may be substantially the same as the INVITE message sent in step 601.

In step 603, the MGCF A 118 sends an IAM to the H-MSC 100. The IAM sent in step 603 includes a number of the UE A 110 as the CgPN, a number of the UE B 120 as the CdPN, and a first CIC CIC1. In step 604, the H-MSC 100 sends an IAM to the MGCF B 128. The IAM sent in step 604 includes the number of the UE A 110 as the CgPN, the number of the UE B 120 as the CdPN, and a second CIC CIC2.

In step 605, the MGCF B 128 sends an INVITE message to the VCC B 132. The INVITE message sent in step 605 includes the URI of UE B 120 and SDP information of the MGW B 124. In step 606, the VCC B 132 routes the INVITE message to the UE B 120. The INVITE message routed in step 606 may be substantially the same as the INVITE message sent in step 605.

In step 607, the UE B 120 sends a 1xx/200 OK message to the VCC B 132. The 1xx/200 OK message sent in step 607 includes a URI of the UE B 120 and SDP information of the UE B 120. In addition, depending on the exemplary implementation, the 1xx/200 OK message sent in step 607 may additionally include COPs and/or rate information of UE B 120. In step 608, the VCC B 132 routes the 1xx/200 OK message to the MGCF B 128. The 1xx/200 OK message routed in step 608 may be substantially the same as the 1xx/200 OK message sent in step 607.

In step 609, the MGCF B 128 sends an ACK message to the VCC B 132. In step 610, the VCC B 132 routes the ACK message to the UE B 120. The ACK message routed in step 610 may be substantially the same as the ACK message sent in step 609.

Meanwhile, in step 611, the MGCF B 128 sends an ACM/ANM to the H-MSC 100. In step 612, the H-MSC 100 routes the ACM/ANM to the MGCF A 118. The ACM/ANM routed in step 611 may be substantially the same as the ACM/ANM sent in step 612.

In step 613, the MGCF A 118 sends a 1xx/200 OK message to the VCC A 131. The 1xx/200 OK message sent in step 613 includes the URI of UE B 120 and SDP information of the MGW A 114. In step 614, the VCC A 131 routes the 1xx/200 OK message to the UE A 110. The 1xx/200 OK message routed in step 614 may be substantially the same as the 1xx/200 OK message sent in step 613.

In step 615, the UE A 110 sends an ACK message to the VCC A 131. In step 616, the VCC A 131 routes the ACK message to the MGCF A 118. The ACK message routed in step 616 may be substantially the same as the ACK message sent in step 615.

It is noted that at this point, the call context maintained at VCC A 131 for the call between UE A 110 and UE B 120 includes the SDP information of UE A 110 and the SDP information of MGW A 114. The call context maintained at VCC A 131 may include COPs and/or rate information. Similarly, the call context maintained at VCC B 132 for the call between UE A 110 and UE B 120 includes the SDP information of UE B 120 and the SDP information of MGW B 124. The call context maintained at VCC B 132 may include COPs and/or rate information.

Herein, it is noted that steps 601 through 616 are similar to steps for establishing a call according to the related art. That is, once the ACK message is received from the UE A 110 in step 616, the IMS voice call is setup through a bearer path that includes CS trunks that traverse through the CDMA 1x wireless communication network (e.g., the H-MSC 100), as shown in FIG. 1. However, VCC A 131 performs a trunk optimization function for bypassing and releasing the CS trunks that traverse through the CDMA 1x wireless communication network. This operation is described below in steps 617 through 639.

Based on the response from the VCC B 132, namely the contents of the 1xx/200 OK message sent in step 613, the VCC A 131 determines whether the VCC A 131 and the VCC B 132 are the same VCC, namely VCC 130. If the VCC A 131 determines that the VCC A 131 and the VCC B 132 are different VCCs, the VCC A 131 continues to process the IMS voice call according to the related art (e.g., the VCC A 131 waits for a Call Release from either UE A 110 or UE B 120). In contrast, if the VCC A 131 determines that the VCC A 131 and the VCC B 132 are the same VCC, namely VCC 130, the VCC A 131 initiates CS trunking optimization once the ACK message is received from the UE A 110 in step 616, which indicates that the IMS call has been setup. Here, it is assumed that the VCC A 131 determines that the VCC A 131 and the VCC B 132 are the same VCC, namely VCC 130. Accordingly, the CS trucking optimization is triggered.

Herein, it also assumed that the UE A 110 and the UE B 120 support different CODECs and it is not considered whether the different CODECs operate in the same COPs at the same rate. Alternatively, it is assumed that that the UE A 110 and the UE B 120 support different CODECs, it is considered whether the different CODECs operate in the same COPs at the same rate, and the different CODECs do not operate in the same COPs at the same rate.

The scenario where the UE A 110 and the UE B 120 support the same CODECs has been described above with reference to FIGS. 2 and 3, and the scenario where the UE A 110 and the UE B 120 support different CODECs that, after consideration of whether different CODECs operate in the same COPs at the same rate, are found to operate in the same COPs at the same rate, is described above with respect to FIGS. 2 and 4.

At this point, the VCC A 131 determined that the VCC A 131 and the VCC B 132 are the same VCC, namely VCC 130. Accordingly, the CS trucking optimization is triggered. The CS trucking optimization according the present exemplary implementation is described below in steps 617 through 629. Herein, while it is assumed that the transcoding is supported by the originating network, the transcoding may alternatively be supported by the terminating network.

In step 617, to initiate CS trucking optimization, the VCC A 131 sends an Optimize Request message to the VCC B 132. The Optimize Request message sent in step 617 includes a Called ID, a Call Context of the call between the UE A 110 and the UE B 120, and SDP information of the UE A 110. At this point, the VCC B 132 determines that UE A 110 and UE B 120 support different CODECs and waits for an updated SDP from VCC A 131. Here, depending on the implementation, the VCC B 132 may determine that UE A 110 and UE B 120 support different CODECs, or the VCC B 132 may determine that UE A 110 and UE B 120 support different CODECs that do not operate in the same COPs at the same rate.

In step 618, VCC B 132 sends an Optimize ACK message to the VCC A 131. The Optimize ACK message sent in step 618 includes the Called ID, the Call Context of the call between the UE A 110 and the UE B 120, and SDP information of the UE B 120. At this point, depending on the implementation, the VCC A 131 determines that UE A 110 and UE B 120 support different CODECs, or the VCC A 131 may determine that UE A 110 and UE B 120 support different CODECs that do not operate in the same COPs at the same rate. In either case, the VCC A 131 acts as a Back-to-Back User Agent (B2BUA) to interwork with MRF A 140 for transcoding.

To facilitate use of the MRF A 140, dialogs for UE A 110 to MRF A 140, and MRF 140 to UE B 120, are established.

The MRF A 140 to UE B 120 dialog is established in steps 619 to 621. More specifically, in step 619, the VCC A 131 sends an INVITE message to the MRF A 140. The INVITE message sent in step 619 includes a second URI of UE B 120 and SDP information of UE B 120. In step 620, the MRF A 140 sends a 200 OK message to the VCC A 131. The 200 OK message sent in step 620 includes first SDP information of MRF A 140. In step 621, the VCC A 131 sends an ACK message to the MRF A 140.

In step 622, the VCC A 131 sends an Optimize Confirm message to the VCC B 132. The Optimize Confirm message sent in step 622 includes the Called ID, the Call Context of the call between the UE A 110 and the UE B 120, and the first SDP information of MRF A 140.

In step 623, the VCC B 132 sends an INVITE message to the UE B 120. The INVITE message sent in step 623 includes a URI of UE B 120 and the first SDP information of the MRF A 140. In step 624, 200 OK and ACK messages are exchanged between the UE B 120 and the VCC B 132.

The MRF A 140 to UE A 110 dialog is established in steps 625 to 627. More specifically, in step 625, the VCC A 131 sends an INVITE message to the MRF A 140. The INVITE message sent in step 625 includes a URI of UE B 120 and SDP information of UE A 110. In step 626, the MRF A 140 sends a 200 OK message to the VCC A 131. The 200 OK message sent in step 626 includes second SDP information of MRF A 140. In step 627, the VCC A 131 sends an ACK message to the MRF A 140.

In step 628, the VCC A 628 sends an INVITE message to the UE A 110. The INVITE message sent in step 628 includes a URI of UE B 120 and second SDP information of the MRF A 140. In step 629, 200 OK and ACK messages are exchanged between the VCC A 131 and the UE A 110.

At this point, the bypass bearer path 150 through MRF A 140 shown in FIG. 5 is established that bypasses the CS trunks.

It is noted that at this point, the call context maintained at VCC A 131 for the call between UE A 110 and UE B 120 includes the SDP information of UE A 110, the SDP information of MRF A 140, and session dialog information for MRF A 140 and UE B 120. The call context maintained at VCC A 131 may include COPs and/or rate information. Similarly, the call context maintained at VCC B 132 for the call between UE A 110 and UE B 120 includes the SDP information of UE B 120 and the first SDP information of MRF A 140. The release of the CS trunks (marked with an 'X') is described below in steps 630 through 637. The call context maintained at VCC B 132 may include COPs and/or rate information.

Meanwhile, to release the CS trunks (marked with an 'X'), in step 630, the VCC A 131 sends a BYE message to the MGCF A 118. The BYE message sent in step 630 includes the URI of UE B 120. In step 631 the MGCF A 118 sends a REL message to the H-MSC 100. The REL message sent in step 631 includes the number of the UE A 110 as the CgPN and the number of the UE B 120 as the CdPN. In step 632, the H-MSC 100 sends a REL message to the MGCF B 128. The REL message sent in step 632 includes the number of the UE A 110 as the CgPN and an IMRN as the CdPN. In step 633, the MGCF B 128 sends a BYE message to the VCC B 132. The BYE message sent in step 633 includes the URI of the UE B 120 and SDP information for UE A 110. In step 634, the VCC B 132 sends a 200 OK message to the MGCF B 128. In step 635, the MGCF B 128 sends a RLC message to the H-MSC 100. In step 636, the H-MSC 100 routes the RLC message to the MGCF A 118. In step 637, the MGCF A 118 sends a 200 OK message to the VCC A 131.

At this point, the CS trunks (marked with an 'X') including CIC1 and CIC2 for the voice call between UE A 110 and UE B 120 are released at the MGW A 114 and the MGW B 124. Herein, it is noted that the CS trunks are released without the VCC B 132 releasing toward the UE B 120.

Regarding call release for when the call is to be terminated, either the UE A 110 or the UE B 120 may initiate Call Release. For convenience in explanation, it is assumed herein that the UE A 110 initiates Call Release. That is, in step 638, the UE A 110 sends a BYE message to the VCC A 131. The BYE message sent in step 638 includes the URI of UE B 120. In step 639, the VCC A 131 sends a Release message to VCC B 132. The Release message sent in step 639 includes the Called ID and the Call Context of the call between the UE A 110 and the UE B 120. In step 640, the VCC B sends a BYE message to the UE B 120. The BYE message sent in step 640 includes the URI of UE B 120. In step 641, the UE B 120 sends a 200 OK message to the VCC B 132. In step 642, the VCC B 132 sends a Release ACK message to the VCC A 131. The Release ACK message sent in step 642 includes the Called ID and the Call Context of the call between the UE A 110 and the UE B 120. In step 643, the VCC A sends a 200 OK message to the UE A 110. In step 644, the VCC A 131 sends a BYE message to the MRF A 140. The BYE message sent in step 644 includes the URI of UE B 120. In step 645 the MRF A 140 sends a 200 OK message to the VCC A 131. In step 646, the VCC A 131 sends a BYE message to the MRF A 140. The BYE message sent in step 646 includes the second URI of UE B 120. In step 647, the MRF A 140 sends a 200 OK message to the VCC A 131. At this point, the voice call is terminated and the bypass bearer path 150 through the MRF A 140 shown in FIG. 5 is released.

A method for an enhanced VCC function to optimize trunks for an IMS voice call is described below with reference to FIG. 7.

Method for Enhanced VCC Function

Figure 7:
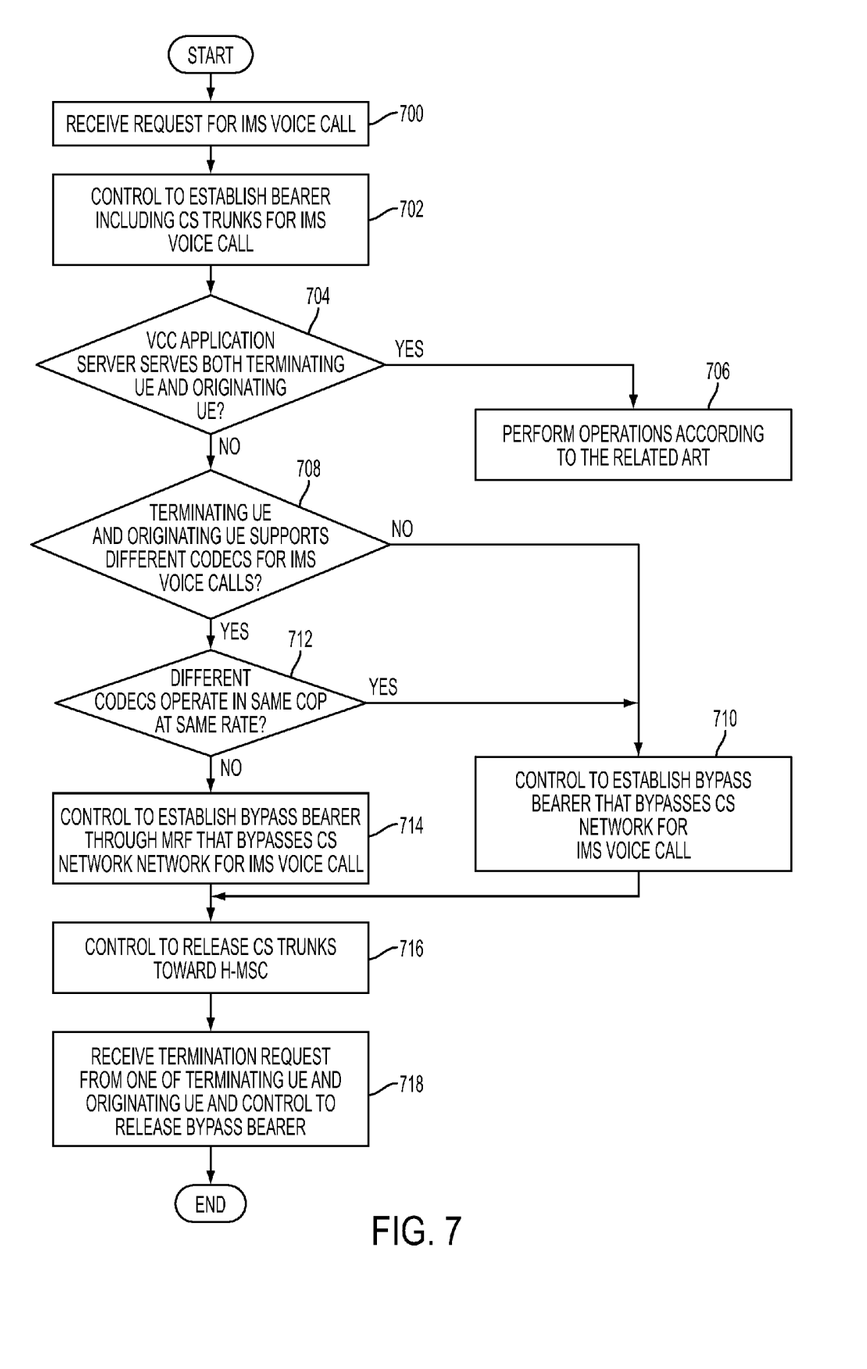
FIG. 7 illustrates a flowchart of a method for an enhanced Voice Call Continuity (VCC) function to optimize trunks for an IMS voice call according to an exemplary embodiment of the present invention.

FIG. 7 illustrates a flowchart of a method for an enhanced VCC function to optimize trunks for an IMS voice call according to an exemplary embodiment of the present invention.

Referring to FIG. 7, in step 700, the enhanced VCC function receives a request from an originating UE for an IMS voice call with a terminating UE. Step 700 substantially corresponds to step 301 of FIG. 3, step 401 of FIG. 4, and step 601 of FIG. 6. In step 702, the enhanced VCC function controls to establish a bearer for the IMS voice call between the terminating UE and the originating UE through the CS network. This bearer is shown as a solid line in FIGS. 1, 2, and 5. Step 702 substantially corresponds to steps 302, 305-310, and 313-316 of FIG. 3, steps 402, 405-410, and 413-416 of FIG. 4, and steps 602, 605-610, and 613-616 of FIG. 6.

In step 704, the enhanced VCC function determines whether the enhanced VCC function serves both the originating UE and the terminating UE. If the enhanced VCC function determines that the enhanced VCC function does not serve both the originating UE and the terminating UE, the enhanced VCC function, in step 706, performs operations according to the related art. In contrast, if the enhanced VCC function determines that the enhanced VCC function serves both the originating UE and the terminating UE, the enhanced VCC function, in step 708, determines whether the originating UE and the terminating UE support different CODECs for IMS voice calls. If the enhanced VCC function determines that the originating UE and the terminating UE support the same CODECs for IMS voice calls, the enhanced VCC function, in step 710, controls to establish a bypass bearer that bypasses the CS network for the IMS voice call. This bypass bearer is shown as bypass bearer 150 in FIG. 2. Step 710 substantially corresponds to steps 317-323 of FIG. 3.

In contrast, if the enhanced VCC function determines that the originating UE and the terminating UE support different CODECs for IMS voice calls, the enhanced VCC function, in step 712, determines if the different CODECs operate in the same COPs at the same rate. If the enhanced VCC function determines that the different CODECs of the originating UE and the terminating UE operate in the same COPs at the same rate, the enhanced VCC function performs step 710. In contrast, if the enhanced VCC function determines that the different CODECs of the originating UE and the terminating UE do not operate in the same COPs at the same rate, the enhanced VCC function proceeds to step 714. Herein, step 712 may be omitted. Step 712 substantially corresponds to steps 417-423 of FIG. 4.

In step 714, the enhanced VCC function controls to establish a bypass bearer through an MRF that bypasses the CS network for the IMS voice call. This bypass bearer is shown as bypass bearer 150 in FIG. 4. Step 714 substantially corresponds to steps 617-629 of FIG. 6.

In step 716, the enhanced VCC function controls to release the CS trunks toward the CS network (e.g., the H-MSC). The release is shown as the trunks marked with an 'X' in FIGS. 2 and 4. Step 716 substantially corresponds to steps 324, 327, 328, and 331 of FIG. 3, steps 424, 427, 428, and 431 of FIG. 4, and steps 630, 633, 634, and 637 of FIG. 6.

Thereafter, in step 718, the enhanced VCC function controls to terminate the IMS voice calls and release the bypass bearer when a termination request is received from either the originating UE or the terminating UE. Step 718 substantially corresponds to steps 332-337 of FIG. 3, steps 432-437 of FIG. 4, and steps 638-647 of FIG. 6.

A structure of a VCC application server according to an exemplary embodiment of the present invention will be described below with reference to FIG. 8.

Structure of VCC Application Server

Figure 8:
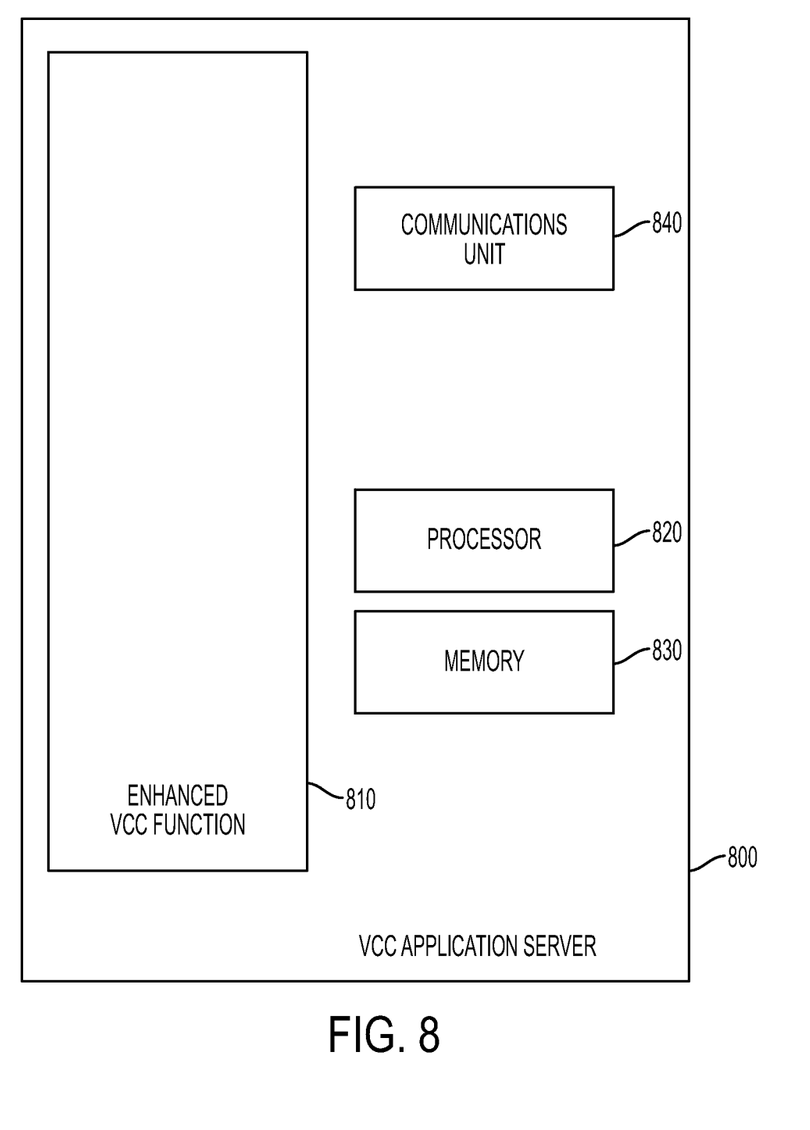
FIG. 8 illustrates a VCC application server according to an exemplary embodiment of the present invention.

FIG. 8 illustrates a VCC application server according to an exemplary embodiment of the present invention.

Herein, it is noted that the VCC application server 800 is referred to as a VCC application server for convince in explanation and that the VCC application server 800 may be any application server which supports the VCC function by itself or in addition to one or more additional functions. Also, the VCC application server 800 may be may be an IMS application server. Alternatively, the VCC application server 800 may not be an IMS application server.

Referring to FIG. 8, the VCC application server 800 includes an enhanced VCC function 810, a processor 820, a memory 830, and a communications unit 840. The VCC application server 800 may include any number of additional structural elements. However, a description of additional structural elements of VCC application server 800 is omitted for brevity.

The enhanced VCC function 810 may be implemented as code that is executed by the processor 820 or may be implemented as hardware. The term "code" may be used herein to represent one or more of executable instructions, operand data, configuration parameters, and other information stored in memory 830 of the VCC application server 800. The operations of the enhanced VCC function 810 include any of the operations explicitly or implicitly described above as being performed by an enhanced VCC function, a VCC function, VCC application server, VCC A 131, VCC B 132, and VCC 130.

The processor 820 is used to process general operations of the device 800 and may be used to execute the code of the enhanced VCC function 810.

The memory 830 may store the code of the enhanced VCC function 810 in addition to one or more of executable instructions, operand data, configuration parameters, and other information stored of the VCC application server 800. Depending on the exact configuration and type of VCC application server 800, the memory 830 may be volatile (such as Random Access Memory (RAM)), non-volatile (such as Read Only Memory (ROM), flash memory, etc.) or some combination of thereof.

The communications unit 840 sends and receives data between the enhanced VCC function 810 and other entities, such as UE A 110, H-MSC 100, etc. The communications unit 840 may include any number of transceivers, receivers, and transmitters of any number of types, such as wired, wireless, etc.

Non-Transitory Processor Readable Medium

At this point it should be noted that the exemplary embodiments of the present disclosure as described above typically involve the processing of input data and the generation of output data to some extent. This input data processing and output data generation may be implemented in hardware, or software in combination with hardware. For example, specific electronic components may be employed in a mobile device or similar or related circuitry for implementing the functions associated with the exemplary embodiments of the present invention as described above. Alternatively, one or more processors operating in accordance with stored instructions (i.e., code) may implement the functions associated with the exemplary embodiments of the present invention as described above. If such is the case, it is within the scope of the present disclosure that such instructions may be stored on one or more non-transitory processor readable mediums. Examples of the non-transitory processor readable mediums include ROM, RAM, Compact Disc (CD)-ROMs, magnetic tapes, floppy disks, and optical data storage devices. The non-transitory processor readable mediums can also be distributed over network coupled computer systems so that the instructions are stored and executed in a distributed fashion. Also, functional computer programs, instructions, and instruction segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for a Voice Call Continuity (VCC) application server to perform trunk optimization for an Internet Protocol (IP) Multimedia Subsystem (IMS) voice call between an originating User Equipment (UE) and a terminating UE, which are homed in a Circuit Switched (CS) network, the method comprising:
   receiving a request from the originating UE for an IMS voice call with the terminating UE;
   determining whether the VCC application server serves both the originating UE and the terminating UE; and
   if it is determined that the VCC application server serves both the originating UE and the terminating UE, controlling to establish a bypass bearer for the IMS voice call between the originating UE and the terminating UE that bypasses the CS network.

2. The method of claim 1, further comprising controlling to establish a bearer for the IMS voice call between the originating UE and the terminating UE through the CS network.

3. The method of claim 2, wherein the bypass bearer for the IMS voice call between the originating UE and the terminating UE that bypasses the CS network is established after the bearer for the IMS voice call between the originating UE and the terminating UE is established through the CS network.

4. The method of claim 3, further comprising, if it is determined that the VCC application server serves both the originating UE and the terminating UE, controlling to release CS trunks of the bearer for the IMS voice call between the originating UE and the terminating UE.

5. The method of claim 1, further comprising:
   determining whether both the originating UE and the terminating UE support the same coder-decoders (CODECs) for IMS voice calls,
   wherein, if it is determined that the originating UE and the terminating UE support different CODECs for IMS voice calls, the bypass bearer for the IMS voice call between the originating UE and the terminating UE is established through a Media Resource Function (MRF) that transcodes the IMS voice call between the terminating UE from the originating UE.

6. The method of claim 5, wherein, if it is determined that both the originating UE and the terminating UE support the same CODECs for IMS voice calls, the bypass bearer for the IMS voice call is established directly between the originating UE and the terminating UE.

7. The method of claim 1, further comprising:
   determining whether both the originating UE and the terminating UE support the same coder-decoders (CODECs) for IMS voice calls; and
   if it is determined that the originating UE and the terminating UE support different CODECs for IMS voice calls, determining whether the different codecs operate in the same Capacity Operating Points (COPs) at the same rate,
   wherein, if it is determined that the different CODECs for IMS voice calls do not operate in the same COPs at the same rate, the bypass bearer for the IMS voice call between the originating UE and the terminating UE is established through a Media Resource Function (MRF) that transcodes the IMS voice call between the terminating UE from the originating UE.

8. The method of claim 7, wherein, if it is determined that both the originating UE and the terminating UE support the same CODECs for IMS voice calls, or if it is determined that the different CODECs for IMS voice call operate in the same COPs at the same rate, the bypass bearer for the IMS voice call between the originating UE and the terminating UE is established directly between the originating UE and the terminating UE.

9. The method of claim 1, further comprising:
receiving a termination request from one of the terminating UE and the originating UE; and
controlling to release the bypass bearer for the IMS voice call between the originating UE and the terminating UE.

10. At least one non-transitory processor readable medium for storing a computer program of instructions configured to be readable by at least one processor for instructing the at least one processor to execute a computer process for performing the method as recited in claim 1.

11. A Voice Call Continuity (VCC) application server apparatus for performing trunk optimization for an Internet Protocol (IP) Multimedia Subsystem (IMS) voice call between an originating User Equipment (UE) and a terminating UE, which are homed in a Circuit Switched (CS) network, the apparatus comprising:
a memory for storing code of a VCC function;
a processor for executing the code of the VCC function stored in the memory;
a communications unit for sending and receiving information for the VCC function; and
the VCC function for receiving a request from the originating UE for an IMS voice call with the terminating UE, for determining whether the VCC function serves both the originating UE and the terminating UE, and, if it is determined that the VCC function serves both the originating UE and the terminating UE, for controlling to establish a bypass bearer for the IMS voice call between the originating UE and the terminating UE that bypasses the CS network.

12. The apparatus of claim 11, wherein the VCC function controls to establish a bearer for the IMS voice call between the originating UE and the terminating UE through the CS network.

13. The apparatus of claim 12, wherein the VCC function establishes the bypass bearer for the IMS voice call between the originating UE and the terminating UE that bypasses the CS network after the bearer for the IMS voice call between the originating UE and the terminating UE is established through the CS network.

14. The apparatus of claim 13, wherein, if the VCC function determines that the VCC function serves both the originating UE and the terminating UE, the VCC function controls to release CS trunks of the bearer for the IMS voice call between the originating UE and the terminating UE.

15. The apparatus of claim 11, wherein the VCC function determines whether both the originating UE and the terminating UE support the same coder-decoders (CODECs) for IMS voice calls, and if the VCC function determines that the originating UE and the terminating UE support different CODECs for IMS voice calls, the VCC function establishes the bypass bearer for the IMS voice call between the originating UE and the terminating UE that bypasses the CS network through a Media Resource Function (MRF) that transcodes the IMS voice call between the originating UE and the terminating UE.

16. The apparatus of claim 15, wherein, if the VCC function determines that both the originating UE and the terminating UE support the same CODECs for IMS voice calls, the VCC function controls to establish the bypass bearer for the IMS voice call directly between the originating UE and the terminating UE.

17. The apparatus of claim 11, wherein the VCC function determines whether both the originating UE and the terminating UE support the same coder-decoders (CODECs) for IMS voice calls, and if the VCC function determines that the originating UE and the terminating UE support different CODECs for IMS voice calls, the VCC function determines whether the different codecs operate in the same Capacity Operating Points (COPs) at the same rate, and
wherein, if the VCC function determines that the different CODECs for IMS voice calls do not operate in the same COPs at the same rate, the VCC function controls to establish the bypass bearer for the IMS voice call between the originating UE and the terminating UE through a Media Resource Function (MRF) that transcodes the IMS voice call between the terminating UE from the originating UE.

18. The apparatus of claim 17, wherein, if the VCC function determines that both the originating UE and the terminating UE support the same CODECs for IMS voice calls, or if the VCC function determines that the different CODECs for IMS voice call operate in the same COPs at the same rate, the VCC function controls to establish the bypass bearer for the IMS voice call directly between the originating UE and the terminating UE.

19. The apparatus of claim 11, wherein, when the VCC function receives a termination request from one of the terminating UE and the originating UE, the VCC function controls to release the bypass bearer for the IMS voice call between the originating UE and the terminating UE.

* * * * *